Patented Sept. 29, 1942

2,297,546

UNITED STATES PATENT OFFICE 2,297,546

REFRACTORY CASTING

Theodore Estes Field, Louisville, Ky., assignor to Corhart Refractories Company, Louisville, Ky., a corporation of Delaware No Drawing. Application July 19, 1941, Serial No. 403,238

4 Claims. (Cl. 106—57)

This invention relates to the manufacture of castings which are refractory to heat and very resistant to attack by chemical fluxes such as molten glass and are therefore useful in glass melting apparatus. The method and techniques to be employed in manufacturing such castings are substantially those disclosed in U. S. Patent #1,615,750 to Fulcher.

In my other application, Serial No. 299,038, now Patent No. 2,271,363, it was disclosed that stable castings of ferrous chromite could be made which were very resistant to corrosion by molten glass. In application Serial No. 301,080, now Patent No. 2,271,368, filed by myself and Gordon S. Fulcher, it was disclosed that stable castings of chromic oxide and $ZrO_2$ could be made which were also very resistant to corrosion by molten glass.

It might be therefore expected that castings of ferrous chromite and $ZrO_2$ would also make excellent refractories and indeed I have found such compositions with or without the addition of 2% or 3% silica to be quite resistant to corrosion by molten glass. Unfortunately however such compositions are not stable and tend to swell and crack when heated in an oxidizing or neutral atmosphere, volume increases of as much as 20% having been noted above the surface of the molten glass at the end of the test.

I have found that the simpler system $FeO$—$ZrO_2$ exhibits the same swelling phenomenon, the amount of swelling increasing as $FeO$ is increased. From this it would be inferred that $FeO$ is not stable in the presence of $ZrO_2$ with which no compound forms but is stable with $Cr_2O_3$ where compound formation occurs. According to this theory the addition of $ZrO_2$ to ferrous chromite must have the effect of dissociating at least part of the ferrous chromite. In any case the swelling is quite similar to the simple $FeO$—$ZrO_2$ system and makes the composition quite unsatisfactory for practical use despite its innate resistance to corrosion.

However a resistant composition which is at the same time stable toward oxidizing or neutral conditions is obtained when alumina as well as iron oxide is added to $ZrO_2$ and $Cr_2O_3$. As in the simpler system, the addition of silica is harmful to corrosion resistance but 2% or 3% can be readily tolerated.

If the iron oxide is less than sufficient to form spinels with all the $Al_2O_3$ and $Cr_2O_3$, the remaining $Al_2O_3$ and $Cr_2O_3$ also forms a solid solution but since this is also resistant to corrosion and does not affect the stability of the refractory, only an excess of iron oxide is to be avoided. This is an advantage because a certain amount of the iron oxide is reduced to metallic iron by the electrodes during melting and it is difficult to produce a preconceived analysis. On the other hand, an excess of iron oxide is easily avoided by correctly proportioning the batch ingredients.

The primary advantage of including iron oxide in the $Cr_2O_3$—$ZrO_2$ refractories is that it permits the use of crude commercial ores rather than relatively pure materials with a consequent appreciable saving in batch cost. High $ZrO_2$ ores for example are obtainable with a maximum of 3% or 4% silica but contain 8% to 10% iron oxide. The alumina which I have found necessary to prevent swelling can be supplied as commercial bauxite. In this case also, holding silica to a minimum necessitates acceptance of relatively high iron oxide. Ores are obtainable for example with from 2% to 4% $SiO_2$ but the iron oxide then runs at least 10%–12% and much higher iron oxide is available.

While chrome ore is often referred to as ferrous chromite, commercial ores always contain appreciable quantities of $SiO_2$, $MgO$ and $Al_2O_3$ as well as $FeO$ and $Cr_2O_3$. Specimen analyses of ores from commercial sources are given on page 205 of Industrial Minerals and Rocks (published by The American Institute of Mining and Metallurgical Engineers, 1937). A few ores with low silica are available but add $MgO$ to the contemplated composition. I have made tests with low silica chrome ores but find that the swelling returns when $ZrO_2$ is present despite the inclusion of alumina. Furthermore the compositions were less refractory tending to slump under their own weight when heated at 1600° C. for extended periods. This difference in behaviour is probably associated with the addition of $MgO$ which is the major composition change involved but at any rate I have not yet found a way to use chrome ore as source of $Cr_2O_3$ in these compositions. The present refractories therefore contemplate the use of chrome green oxide, although any of the chrome ores beneficiated by removal of the $MgO$ can presumably be used since, in general, the properties of heat cast refractories depend only on the final chemical composition and not upon the particular ingredients which supply the desired oxides.

Specific compositions of batches which I have found to give refractories both resistant to corrosion by glass, and stable to oxidizing or neutral atmospheres, are given by way of illustration below.

Table I

| Example | I | II | III | IV | V | VI | VII |
|---|---|---|---|---|---|---|---|
| Percent $Cr_2O_3$ | 40.0 | 40.0 | 40.0 | 20.0 | 20.0 | 20.0 | 20.0 |
| Percent $ZrO_2$ | 20.0 | 20.0 | 20.0 | 40.0 | 40.0 | 20.0 | 20.0 |
| Percent $Fe_2O_3$ | 21.2 | 10.2 | 13.8 | 17.9 | 10.0 | 21.2 | 10.2 |
| Percent $Al_2O_3$ | 17.0 | 28.0 | 22.8 | 19.0 | 27.0 | 37.0 | 48.0 |
| Percent $SiO_2$ | 1.1 | 1.1 | 2.3 | 2.2 | 2.2 | 1.1 | 1.1 |
| Percent $TiO_2$ and others | 0.7 | 0.7 | 1.1 | 0.9 | 0.8 | 0.7 | 0.7 |

The molecular composition of the above batches is—

Table II

| Example | I | II | III | IV | V | VI | VII |
|---|---|---|---|---|---|---|---|
| Mols $Cr_2O_3$ | .263 | .263 | .263 | .132 | .132 | .132 | .132 |
| Mols $ZrO_2$ | .162 | .162 | .162 | .325 | .325 | .162 | .162 |
| Mols $FeO$ | .266 | .128 | .173 | .224 | .125 | .266 | .128 |
| Mols $Al_2O_3$ | .167 | .275 | .224 | .186 | .265 | .363 | .471 |
| Mols $SiO_2$ | .018 | .018 | .038 | .037 | .037 | .018 | .018 |

During the melting, the $Fe_2O_3$ is largely reduced to FeO. If the commercial materials do not give the amount of FeO standardized upon, adjustments can be made if desired by adding $Fe_2O_3$ or $Fe_3O_4$ or $Al_2O_3$ as required.

Since all three of the crystal phases, zirconia, ferrous chromite-ferrous aluminate solid solution, and chromic oxide-alumina solid solution are very resistant to corrosion by molten glass, any composition within the ternary system is suitable. From the practical standpoint however since the zirconia ore is cheaper than $Cr_2O_3$ there is some saving in using the maximum amount of this material which will permit keeping the silica below 4%. On the other hand since high $Fe_2O_3$ bauxite or iron oxide itself is cheaper than $Cr_2O_3$ it is also advantageous to use enough iron oxide to form the spinel with $Cr_2O_3$ and to minimize the more expensive $Cr_2O_3$—$Al_2O_3$ solid solution. The amount of $Al_2O_3$ supplied by the bauxite in contributing $Fe_2O_3$ to the batch is sufficient to stabilize the refractory against excessive swelling. Since the resistance to corrosion by molten glass for the solid solution of ferrous chromite and ferrous aluminate decreases as the proportion of ferrous aluminate increases, I normally prefer to keep the $Al_2O_3$ content somewhat lower than the $Cr_2O_3$ content when high resistance is required.

What I claim is:

1. A heat cast refractory consisting of zirconia, chromic oxide, alumina and iron oxide, and in which any silica present amounts to less than 4% by weight and the mols of iron oxide are less than the sum of the mols of the alumina plus chromic oxide.

2. A heat cast refractory consisting of 15%–60% zirconia, 10%–60% chromic oxide, 5%–25% iron oxide, more than 10% alumina, and containing less than 4% silica.

3. A heat cast refractory the crystalline phases of which include zirconia and a solid solution of ferrous chromite with ferrous aluminate.

4. A heat cast refractory the crystalline phases of which principally consist of zirconia, a solid solution of ferrous chromite with ferrous aluminate, and a solid solution of chromic oxide with alumina.

THEODORE ESTES FIELD.